US012743852B2

(12) United States Patent
Sun et al.

(10) Patent No.: US 12,743,852 B2
(45) **Date of Patent: *Sep. 22, 2026**

(54) PREDICTION OF MECHANICAL PROPERTIES OF SEDIMENTARY ROCKS BASED ON A GRAIN TO GRAIN PARAMETRIC COHESIVE CONTACT MODEL

(71) Applicant: Dassault Systemes Americas Corp., Waltham, MA (US)

(72) Inventors: Zhuang Sun, San Francisco, CA (US); Rafael Salazar-Tio, San Francisco, CA (US); Andrew Fager, San Francisco, CA (US); Bernd Crouse, Brisbane, CA (US)

(73) Assignee: Dassault Systemes Americas Corp., Waltham, MA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/644,176

(22) Filed: Apr. 24, 2024

(65) Prior Publication Data

US 2024/0290039 A1 Aug. 29, 2024

Related U.S. Application Data

(63) Continuation of application No. 17/342,817, filed on Jun. 9, 2021, now Pat. No. 12,002,159.

(51) Int. Cl.

*G06T 17/20* (2006.01)
*G06T 11/10* (2026.01)

(Continued)

(52) U.S. Cl.

CPC .............. *G06T 17/20* (2013.01); *G06T 11/10* (2026.01); *G06T 12/20* (2026.01); *G06T 12/30* (2026.01); *G06T 15/04* (2013.01)

(58) Field of Classification Search

None

See application file for complete search history.

(56) References Cited

U.S. PATENT DOCUMENTS

| | | | |
|---|---|---|---|
| 9,348,056 | B2 | 5/2016 | Fredrich et al. |
| 12,002,159 | B2 | 6/2024 | Sun et al. |

(Continued)

FOREIGN PATENT DOCUMENTS

| | | |
|---|---|---|
| CN | 112313758 | 2/2021 |
| WO | WO 2012/003027 | 1/2012 |

OTHER PUBLICATIONS

[No Author Listed], "1.1.45 UWAVE: User subroutine to define wave kinematics for an ABAQUS/Aqua analysis," ABAQUS, 2010, 4 pages.

(Continued)

*Primary Examiner* — Aaron M Richer

(74) *Attorney, Agent, or Firm* — Fish & Richardson P.C.

(57) ABSTRACT

Disclosed are computer implemented techniques for conducting a simulation of physical properties of a porous medium. The features include receiving a micro-CT 3D image that captures a representative elemental volume of the porous medium, the porous medium defined as having mineral types and fluid types with individual grains and grain to grain contacts, labeling the micro-CT 3D image as individual voxels according to mineral and fluid types and labeling the mineral type voxels as belonging to separated and fixed individual grains. The features also include transforming the labeled voxels into an unstructured conformal mesh representation for all grains and applying the unstructured conformal mesh representation to a parametric cohesive contact engine, with the parametric cohesive contact engine executing a parametric cohesive contact model that (Continued)

has an adjustable parameter, a critical separation $\delta^0$ conditioned according to consolidation level.

20 Claims, 14 Drawing Sheets

(51) Int. Cl.

| | |
|---|---|
| ***G06T 12/20*** | (2026.01) |
| ***G06T 12/30*** | (2026.01) |
| ***G06T 15/04*** | (2011.01) |

(56) References Cited

U.S. PATENT DOCUMENTS

| | | | |
|---|---|---|---|
| 2010/0017136 | A1 | 1/2010 | Birchwood et al. |
| 2013/0229892 | A1 | 9/2013 | Skjei et al. |
| 2015/0043787 | A1 | 2/2015 | Fredrich et al. |
| 2019/0050508 | A1 | 2/2019 | Crouse et al. |
| 2019/0212241 | A1 | 7/2019 | Crouse et al. |
| 2020/0063532 | A1 | 2/2020 | Crouse et al. |
| 2022/0398807 | A1 | 12/2022 | Sun et al. |

OTHER PUBLICATIONS

Andra et al., "Digital rock physics benchmarks—part II: Computing effective properties," Computers & Geosciences, Jan. 2013, 50:33-43.

Extended European Search Report in European Appln. No. 22177623.0, mailed on Oct. 11, 2022, 12 pages.

Harkness et al., "Contact Stress Accuracy with Robust and Broadly Applicable Implicit Contact Algorithm," NWC (Nafems World Congress), May 2011, 15 pages.

Latief et al., "Continuum reconstruction of the pore scale microstructure for Fontainebleau sandstone," Physica A: Statistical Mechanics and its Applications, Apr. 2010, 389(8):1607-1618.

Legland et al., "MorphoLibJ: integrated library and plugins for mathematical morphology with ImageJ," Bioinformatics, Nov. 2016, 32(22):3532-3534.

Obermayr et al., "A bonded-particle model for cemented sand," Computers and Geotechnics, Apr. 2013, 49:299-313.

Potyondy et al., "A bonded-particle model for rock," International Journal of Rock Mechanics and Mining Sciences, Dec. 2004, 41(8):1329-1364 (Abstract Only).

Qin et al., "Micromechanics of multiaxial plasticity of DP600: experiments and microstructural deformation modeling," Materials Science and Engineering: A, Apr. 2018, 721:168-178.

Saxena et al., "Rock compressibility from microcomputed tomography images: Controls on digital rock simulations," Geophysics, Jul. 2019, 84(4):WA127-139.

Sun et al., "Discrete element modeling of indentation tests to investigate mechanisms of $CO_2$-related chemomechanical rock alteration," Journal of Geophysical Research: Solid Earth, Nov. 2016, 121(11):7867-7881.

Sun et al., "Prediction of rock elastic moduli based on a micromechanical finite element model, " Computers and Geotechnics, Jul. 2021, 135:104149, 12 pages.

PREDICTION OF MECHANICAL PROPERTIES OF SEDIMENTARY ROCKS BASED ON A GRAIN TO GRAIN PARAMETRIC COHESIVE CONTACT MODEL

BACKGROUND

Multi-component fluid flows through porous regions is an important characteristic of hydrocarbon reservoir rocks and a crucial input to oil and gas industries, as well as other industries.

Numerical simulation of multi-component fluid flows in porous regions with complex solid structures is of great importance in many industrial applications, for example, Enhanced Oil Recovery (EOR) and Personal Protective Equipment (PPE). In order to achieve accurate simulation results, it is important to capture relevant data from all scales of a porous structure.

In the oil and gas industry, so called digital rock simulations have been developed based on x-ray micro-tomography (micro-CT) imaging that allows for the capture of pore-scale three-dimensional (3D) images of structures of reservoir rocks at the micro-meter scale. Such images are used to conduct computer simulations of a simulated flow of fluids (i.e., oil/water) under different production conditions.

However, digital rock simulation of rock mechanical properties has been considered challenging given the intrinsic limitation of micro-CT images to capture the degree of consolidation between grains in rocks, due to the limit in imaging resolution. Another drawback is that micro-CT images are typically obtained at ambient conditions which do not capture the actual net confining stress (NCS) on pore structure.

Different levels of consolidation, compaction, recrystallization, and diagenesis in general, can produce a wide range of grain contact behavior in sedimentary rocks, from loosely consolidated sand packs to completely fused grains that form a single solid structure. Numerical methods in the literature typically use a single solid frame formed by the mineral grains, often overestimating the simulated rock stiffness as compared with experimental measurements. Some ideas have been discussed to assign different properties to contact regions and grain regions.

SUMMARY

A commonality among these prior art methods is that grain relocation is not allowed, which limits the grain-grain contact behavior of real rocks as well as rock failure of large displacements.

According to an aspect, a computer implemented method a computer implemented method for conducting a simulation of physical properties of a porous medium includes receiving by a computer, a micro-CT 3D image that captures a representative elemental volume of the porous medium, the porous medium defined as having mineral types and fluid types with individual grains and grain to grain contacts, labeling by the computer the micro-CT 3D image as individual voxels according to mineral and fluid types, labeling by the computer the mineral type voxels as belonging to separated and fixed individual grains, transforming by the computer the labeled voxels into an unstructured conformal mesh representation for all grains, and applying the unstructured conformal mesh representation to a parametric cohesive contact engine, with the parametric cohesive contact engine executing a parametric cohesive contact model that has an adjustable parameter, a critical separation $\delta^0$ that is conditioned according to a consolidation level.

Embodiments of the method can include any one or more of the following features or other features, as disclosed herein.

The second segmenting is performed by a watershed method. The micro-CT 3D has sufficient resolution to identify individual grains and a connected pore geometry. The grains are free grain contact where only friction is model between grains, and fixed grain contact where grains are completely fused. Transforming the labeled voxelized 3D image further includes optimizing elements of the same grain for a finite element simulation, with the elements at each side of a contact between grains conforming to each other without voids or overlaps in the contact boundary.

The parametric cohesive contact engine relates the critical separation $\delta^0$ to the consolidation level defined as C according to:

$$\delta^0 = \Delta x \frac{C}{1 - C}$$

where $\Delta x$ is the characteristic length with the same units of $\delta^0$.

The $\Delta x$ is estimated from the grain size distribution or grain-grain contact area distribution, as extracted from the micro-CT 3D image. The consolidation level is a dimensionless value and changes from 0 to 1 with an increasing level of consolidation. The $\delta^0=\infty$, C=1 and for $\delta^0=0$, C=0, C represents two extreme of fixed and free grain-grain contacts. The porous medium is a porous rock sample, and the method further includes applying the parametric cohesive contact engine to a finite element solver with prescribed strains/stress boundary conditions and grain-grain contacts according to the parametric cohesive contact model, determining contact behaviors at different levels of grain consolidation to convert the parametric cohesive contact engine into a net confining stress model, and performing a flow simulation on the net confining stress model.

Aspects also include a computer system and computer program product.

One or more of the above aspects may provide one or more of the following advantages.

The approach described herein provides a workflow that more correctly models variable grain-grain consolidation to correctly simulate mechanical rock properties, while being capable of recovering the correct net confining stress (NCS) pore structures to simulate petro-physical properties under the correct conditions, and allow grain relocation capabilities, including failure test simulations.

The approach described uses a parameterized cohesive contact model that can capture both extreme contact behaviors: free grains and fixed gains, as well as intermediate degree(s) of grain consolidation. The approach addresses problems including: (1) modeling variable grain-grain consolidation to correctly simulate mechanical rock properties, (2) recovering correct NCS pore structure to simulate petrophysical properties under in-situ conditions, and (3) allowing for grain relocation, including failure test simulations.

The proposed approach can be used to simulate petrophysical properties at NCS, such as fluid flow in porous rocks and is applicable to the Lattice Boltzmann Method, as well as other computational fluid dynamics methods including finite-volume method, finite-element method, etc.

Other features and advantages of the invention will become apparent from the following description, and from the claims.

DETAILED DESCRIPTION

This application describes a parametric cohesive contact model executed in a parametric cohesive engine to simulate a wide range of sedimentary rocks, from unconsolidated to well-consolidated rocks and a benchmark study on sandstone samples that is compared to laboratory-measured elastic moduli to calibrate the parametric cohesive contact engine degree of consolidation. In addition, numerically uniaxial compression tests are performed to demonstrate the impact of properly capturing the degree of consolidation on the rock strength and failure pattern.

Figure 1:
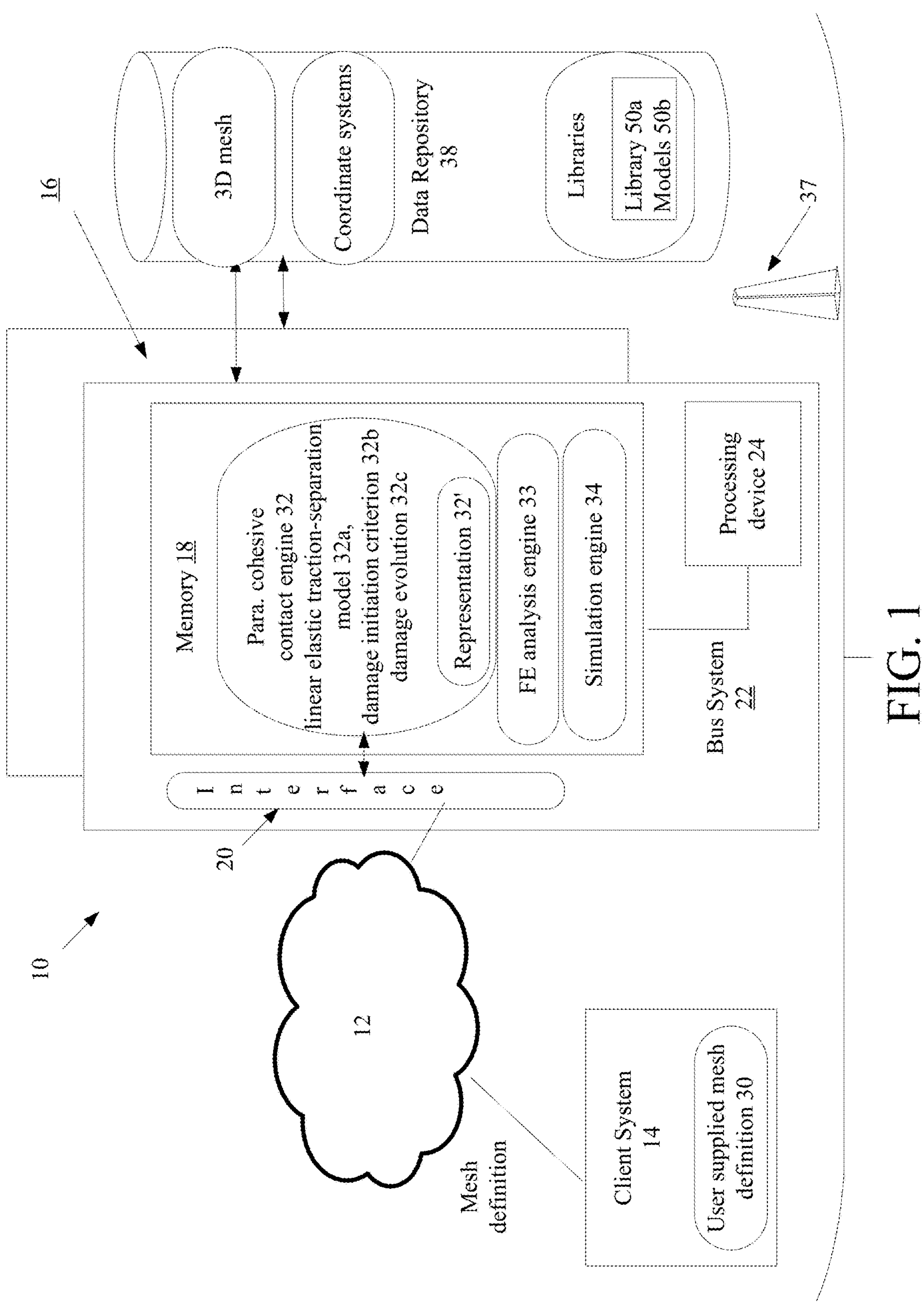
FIG. 1 depicts a system for simulation of micro-mechanics modeling using models of a porous structure.

Referring to FIG. 1, a system 10 for conducting a simulation of physical properties of multi-scale porous material using a cohesive contact model that captures both extreme contact behaviors, i.e., free grains and fixed gains, as well as intermediate degrees of grain consolidation is shown. A finite element (FE) simulation is performed on results of the parametric contact model to produce a net confining stress (NCS) model as an input to a flow simulation. The flow simulation can be for various purposes such as to simulate a "wettability restoration" or an "aging" process representative of a subsurface reservoir conditions, i.e., "numerical aging." Other simulations can include the effect of a vapor stream on PPE, and the like. The flow simulation can use the Lattice Boltzmann or other computational fluid dynamics approach.

In general, the system 10 in this implementation is based on a client-server or cloud-based architecture and includes a network 12, e.g., the internet or other network, a client system 14 including a user supplied mesh, a server system 16 implemented as a massively parallel computing system (stand alone or cloud-based) functionally coupled to the client system 14. The server system 16 includes memory 18, a bus system 22, interfaces 20 (e.g., user interfaces/network interfaces/display or monitor interfaces, etc.) and a processing device 24.

In memory 18 is a parametric cohesive contact engine 32 that operates on a digital representation 32' of a physical rock sample. The digital representation 32' of the physical rock sample is representative of a pore space, grains and grain boundaries of the physical rock sample. The parametric cohesive contact engine 32 can be used to simulate a bonded interface, with or without the possibility of damage and failure of the bond. The parametric cohesive contact engine 32 includes a linear elastic traction-separation model 32_a_, a damage initiation criterion model 32_b_, and damage evolution model 32_c_, all of which allow a precise description of grain contact behavior.

The contact model can be used with an FE analysis engine 33 to provide NCS model as an input to the flow simulation engine 34 for simulating multi-phase flow behavior that occurs through a reservoir rock, e.g., adjacent a gas or oil well (e.g., a drilling rig 37). Determining the multi-phase flow behavior can include for example determining the wettability alteration of the physical rock sample.

The digital representation 32' of the physical rock sample can be a third-party application that is executed on the same or a different system than server 16. The system 10 merely requires the digital representation 32' of the physical rock sample, so that the cohesive contract engine 34 digitally prepares the digital representation 32' of the physical rock sample.

One approach to providing the digital representation 32' of the rock sample is to obtain the representation 32', for example, from a 3D image generated from a micro-CT scan of the rock sample. The micro-CT 3D image is voxelized and is used as an input to identify individual grains and a connected pore geometry of rock. The limitations of micro-CT images for properly capturing a micro-mechanics rock model are related to the insufficient contrast for the identification of different mineral grains, and for the identification of grain-grain contacts between same mineral grains. Identification of grain mineralogy and contacts can be improved by complementing 3D micro-CT imaging with 2D higher resolution and mineralogy imaging such as scanning electron microscopy (SEM) and energy dispersive x-ray spectroscopy (EDS).

In order to setup the finite element (FE) micro-mechanics rock model from micro-CT data, two pre-processing steps are required: (1) grain-grain segmentation and (2) conformal meshing of grain contacts. For a description of these steps, see Z. Sun, R. Salazar-Tio, L. Duranti, B. Crouse, A. Fager, and G. Balasubramanian, Prediction of Rock Elastic Moduli Based on a Micromechanical Finite Element Model, Comput. Geotech. 135, 104149 (2021). A brief description is set out below.

For grain-grain segmentation, a direct binary threshold operation is applied to the micro-CT to classify the voxels as pore or solid. After this threshold operation, the solid voxels are reclassified with an integer index that represents which grain the voxel belongs with. For this purpose we use a class of algorithms refer as watershed methods used for separating touching objects in binary images. See D. Legland, I. Arganda-Carreras, and P. Andrey, Morpho Lib J: Integrated Library and Plugins for Mathematical Morphology with Image J, Bioinformatics 32, 3532 (2016) for further details. The watershed method first computes a distance transform of the 3D image, where for each solid voxel, the value of the Euclidean distance to the nearest pore/solid interface is recorded. If this is considered as a topographic depth map, the deeper parts of the image are the center of the objects. A watershed classification considers each solid voxel by the center to which it will roll down when following this inverted distance transform topographic map. In the final grain segmented 3D image, each grain voxel has the value of the corresponding grain index, while pore voxels are labelled as 0.

In order to achieve an initial static solution for the segmented grains, a conformal mesh is provided at the grain-grain contacts. A conformal mesh indicates that there is neither separation nor overclosure between any two grains in contact. The labeled voxelized 3D image is transformed into an unstructured mesh representation, where elements of the same grain are suitable for a finite element (FE) simulation and the elements at each side of a contact between grains conform to each other perfectly, without voids or overlaps in the contact boundary. See Z. Sun, R. Salazar-Tio, L. Duranti, B. Crouse, A. Fager, and G. Balasubramanian, Prediction of Rock Elastic Moduli Based on a Micromechanical Finite Element Model, Comput. Geotech. 135, 104149 (2021) for a more thorough explanation. The mesh is generated for all of the grains together, while maintaining the indices representing segmented grains, which results in a conformal mesh at the grain-grain contact. The mesh can be either two separate surfaces or one combined interface, which corresponds to two case scenarios of free or fixed grain-grain contacts.

The meshed model is input into the FE solver 33 with prescribed strains/stress boundary conditions and grain-grain contact models. See S. Qin, R. Mclendon, V. Oancea, and A. M. Beese, Micromechanics of Multiaxial Plasticity of DP600: Experiments and Microstructural Deformation Modeling, Mater. Sci. Eng. A 721, 168 (2018); Abaqus, Abaqus 6.10 Online Documentation, Abaqus User Subroutines Ref. Man. (2010) for a more complete explanation.

Parametric Cohesive Contact Engine

A general parametrization of the base contact model is used to capture contact behaviors of different levels of grain consolidation including two extreme scenarios: free grains, where only friction is modeled between grains, and fixed grains, where grains are completely fused. In terms of the FE simulations, the free grain contacts introduce duplicate nodes and elements that allows grain relocation whereas the fixed grain contacts model the solid framework as a whole.

Once the results of the parametrized cohesive contact model are applied to the FE solver 33, FE results are subsequently applied to, e.g., a fluid simulation 34.

For details on a fluid simulation process 34 please refer to U.S. patent application titled: "Multi-Phase Flow Visualizations Based On Fluid Occupation Time," Ser. No. 15/880,867, filed Jan. 26, 2018, and assigned to the assignee of the current application. For other exemplary cases please see U.S. patent application titled: "Determining Fluid Flow Characteristics Of Porous Mediums," Ser. No. 16/243,285, filed Jan. 9, 2019; or U.S. patent application titled: "Determination Of Oil Removed By Gas Via Miscible Displacement In Reservoir Rock," Ser. No. 16/545,387, filed Aug. 20, 2019, all of which are assigned to the assignee of the current application.

The memory 18 may store parameters used by the engines 32, 33 and 34. In particular, parameters used could include grain surface properties obtained by assigning mineral types to the grains to determine the surface properties for each of those mineral types, and surface texture and roughness properties, for one or more of the above applications of the disclosed subject matter. The memory 18 may also store parameters such as fluid properties, e.g., fluid density and viscosity of each expected fluid, (e.g., two or more of water, gas, oil) and fluid-fluid interfacial tension properties. The memory 18 also stores parameters such as chemical composition data of the fluids and affinity data of the fluid components for the particular mineral types. The memory 18 also stores disjoining pressure for each mineral type in combination with the fluids used by the flow simulation engine 34. In addition, reservoir pressure and temperature data are also stored. The mineral types evaluated can be those found or expected at the actual site of the reservoir.

The simulation engine 34 can include a module to set up the rock sample simulation environment, a module to perform a drainage/imbibition simulation, and a module to calculate local curvature of surfaces in the pore space. The simulation engine 34 can also include a module 50 that performs processing of the multi-scale porous material having under-resolved region(s).

The system 10 accesses a data repository 38 that stores 3D meshes, coordinate systems, and libraries that can be used for apply a mesh to the 3D image generated from a micro-CT scan of the rock sample, and for fluid simulations such as drainage/imbibition simulations using any well-known computational technique such as computational fluid dynamics or the so-called Lattice Boltzmann method.

The concept of "bonded grains" has been widely adopted in discrete element method (DEM), which simulates each individual grain as a discrete rigid body, as discussed in M. Obermayr, K. Dressler, C. Vrettos, and P. Eberhard, A Bonded-Particle Model for Cemented Sand, Comput. Geotech. 49, 299 (2013), D. O. Potyondy and P. A. Cundall, A Bonded-Particle Model for Rock, Int. J. Rock Mech. Min. Sci. 41, 1329 (2004) or Z. Sun, D. N. Espinoza, and M. T. Balhoff, Discrete Element Modeling of Indentation Tests to Investigate Mechanisms of CO2-Related Chemo-Mechanical Rock Alteration, J. Geophys. Res. Solid Earth 121, 7867 (2016).

Figures 2A, 2B:
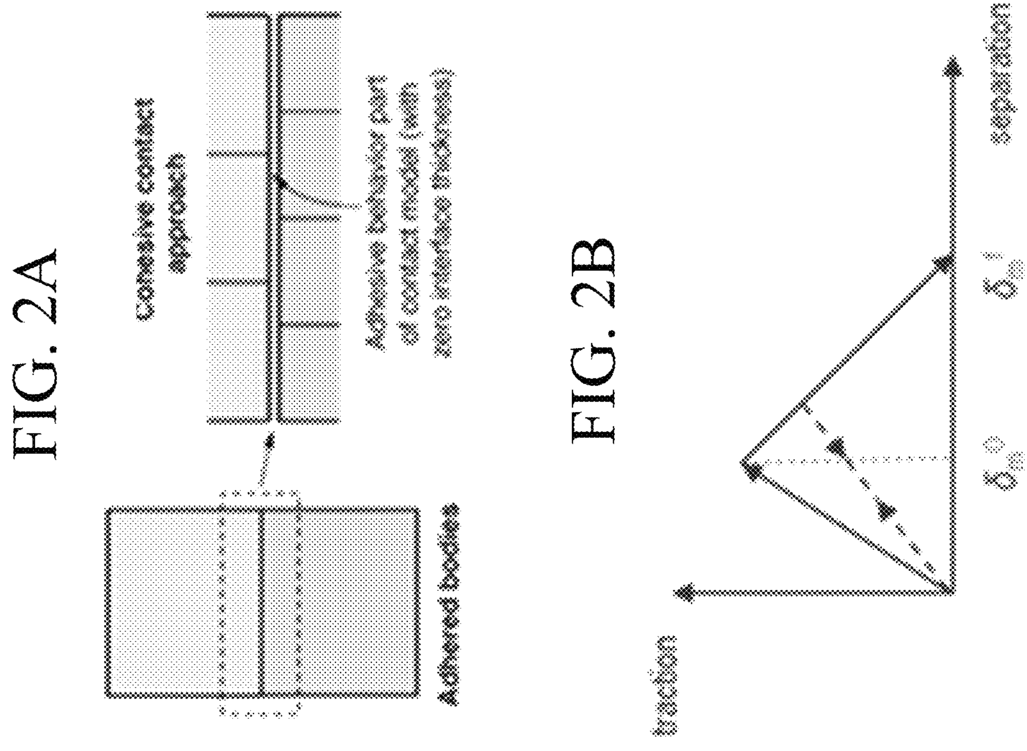
FIGS. 2A, 2B are a diagram that depicts cohesive contact behavior and a graph that depicts a typical traction-separation response.

Similarly, the FE simulations can simulate the bonded grain interface based on the cohesive contact model, with or without the possibility of damage and failure of the bond (FIG. 2A). The parametric cohesive contact engine 32 include the linear elastic traction-separation model 32*a*, damage initiation criterion 32*b*, and damage evolution 32*c*, which allow a precise description of the contact behavior. Discussed below is an overview of a contact model. More details on the contact model can be found in the FE solver documentation (see Abaqus 6.10 Online Documentation, Abaqus User Subroutines Ref. Man. (2010); H. Harkness, G. Ang, P. Vijalapura, and D. Cojocaru, Contact Stress Accuracy with Robust and Broadly Applicable Implicit Contact Algorithm, in NWC (Nafems World Congress) (2011).

The parametric cohesive contact engine 32 assumes the traction-separation behavior initially elastic followed by the damage initiation and evolution. The elastic matrix K relates the normal and shear stresses to the normal and shear separations:

$$\begin{bmatrix} t_R \\ t_S \end{bmatrix} = \begin{bmatrix} K_{RR} & 0 \\ 0 & K_{SS} \end{bmatrix} \begin{bmatrix} \delta_R \\ \delta_S \end{bmatrix} \quad \text{Eq. (1)}$$

where $t_R$ and $t_S$ represent the traction stress components in normal and shear directions, $\delta_R$ and $\delta_S$ represent the corresponding separations. Normal compressive stress follows the usual contact behavior. The damage modeling includes a damage initiation criterion 32_b_ and a damage evolution criterion 32_c_. Damage initiation 32_b_ begins when the separations satisfy the specified initiation criteria:

$$\max\left\{\frac{\delta_R}{\delta_R^0}, \frac{\delta_S}{\delta_S^0}\right\} = 1 \quad \text{Eq. (2)}$$

where $\delta_R^0$ and $\delta_S^0$ are critical separations in normal and shear directions. Note that purely compressive stress (negative value) does not result in damage. The damage evolution criteria 32_c_ describes the degradation rate of the contact stiffness once the damage initiation criteria 32_b_ starts. The contact stresses follow:

$$t_R = (1-D)\bar{t}_R \quad \text{Eq. (3, 4)}$$

$$t_S = (1-D)\bar{t}_S$$

where D is the damage variable, $\bar{t}_R$, and $\bar{t}_S$ are contact stresses predicted by the elastic behavior (Eq. (1)) without damage. The damage variable D changes from 0 to 1 as the damage initiates 32_b_ and evolves 32_c_ and can be specified as a linear function of the effective separation, where $\delta_m$, $\delta_m^f$ and where $\delta_m^0$ are the effective separation at complete failure and damage initiation, respectively. The term $\delta_m^{max}$ refers to the maximum value of the effective separation attained during the loading history.

$$D = \frac{\delta_m^f\left(\delta_m^{max} - \delta_m^0\right)}{\delta_m^{max}\left(\delta_m^f - \delta_m^0\right)} \quad \text{Eq. (5)}$$

$$\delta_m = \sqrt{\delta_R^2 + 2\delta_S^2} \quad \text{Eq. (6)}$$

Referring now to FIG. 2A, a schematic of cohesive contact behavior and FIG. 2B a typical traction-separation response plot for the parametric cohesive contact engine 32 are shown. The parameters of the parametric cohesive contact engine 32 include the stiffness in normal and shear directions $K_{RR}$ and $K_{SS}$ for the elastic behavior, the critical separation $\delta_R^0$. and $\delta_S^0$, and the effective separation at complete failure of for the damage behavior. The parametric cohesive contact engine 32 assumes that stiffness normal and shear directions $K_{RR}=K_{SS}$, $\delta_R^0=\delta_S^0=\delta^0$, and $\delta_m^f=2.5\times\delta_m^0$ to reduce the number of parameters. The stiffness in the normal and shear directions $K_{RR}$ and $K_{SS}$ are predetermined to reproduce the mechanical behavior of fixed grain-grain contacts when no damage occurs. That is, it is possible to determine the values of $K_{RR}$ and $K_{SS}$ to make sure that results are consistent with the fixed grain-grain contacts.

Therefore, the parametric cohesive contact engine 32 has only one adjustable parameter of the critical separation $\delta^0$, which is conditioned by a consolidation level 'C.' The parametric cohesive contact engine 32 relates the critical separation $\delta^0$ to the consolidation level C as follows:

$$\delta^0 = \Delta x \frac{C}{1-C} \quad \text{Eq. (7)}$$

where $\Delta x$ is the characteristic length (with the same unit of $\delta^0$), and can be estimated for example from the grain size distribution or grain-grain contact area distribution, as extracted from the 3D image itself. C is a dimensionless value and changes from 0 to 1 with an increasing level of consolidation. Eq. (7) indicates that $\delta^0=\infty$ when C=1 and $\delta^0=0$ when C=0, representing the two extreme scenarios of fixed and free grain-grain contacts.

Figures 3A, 3B, 3C:
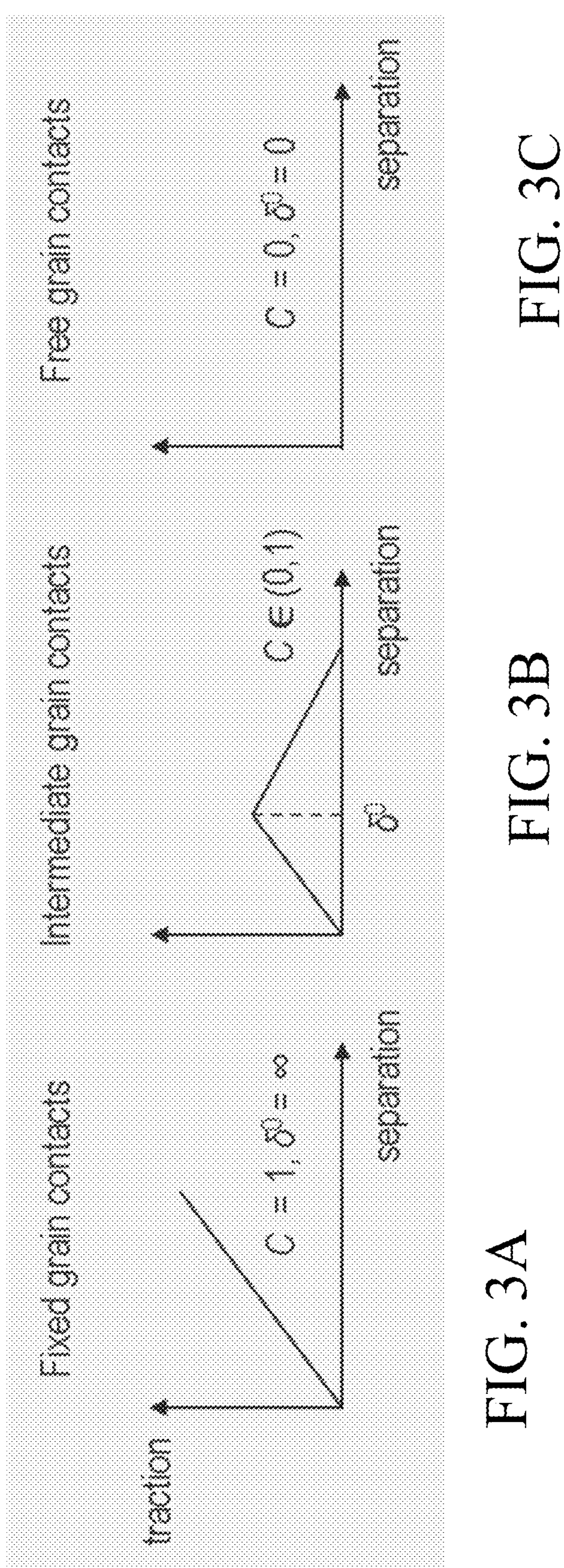
FIGS. 3A-3C depict traction-separation response curve for fixed grains, intermediate grain contacts and free grain contacts, respectively.

Referring now to FIGS. 3A to 3C, typical traction-separation responses curves for various consolidation levels is shown.

FIG. 3A shows the traction-separation response curve for fixed grain contacts, where the curve has C=1 and $\delta^0=\infty$. FIG. 3B shows the traction-separation response curve for intermediate grain contacts where $C\in(0, 1)$. FIG. 3C shows the traction-separation response curve for free grain contacts, where C=0. These traction-separation curves for the various consolidation levels are quantified by parameter C. FIGS. 3A to 3C represent the parametric cohesive contact engine 32 and illustrates a general parameterization that captures contact behaviors at different levels of grain consolidation. This parametric cohesive contact engine 32 allows grain relocation capabilities, instead of modeling the grain space as a single solid, whole framework of grains.

The cohesive contact model 32 can simulate linear elastic moduli comparable with experimental values, as well as simulating significant compaction found at in situ conditions, which are difficult to capture using micro-CT imaging at ambient conditions. The parametric cohesive contact engine 32 can simulate a wide range of sedimentary rocks, from unconsolidated to well-consolidated rocks.

Figure 4B:
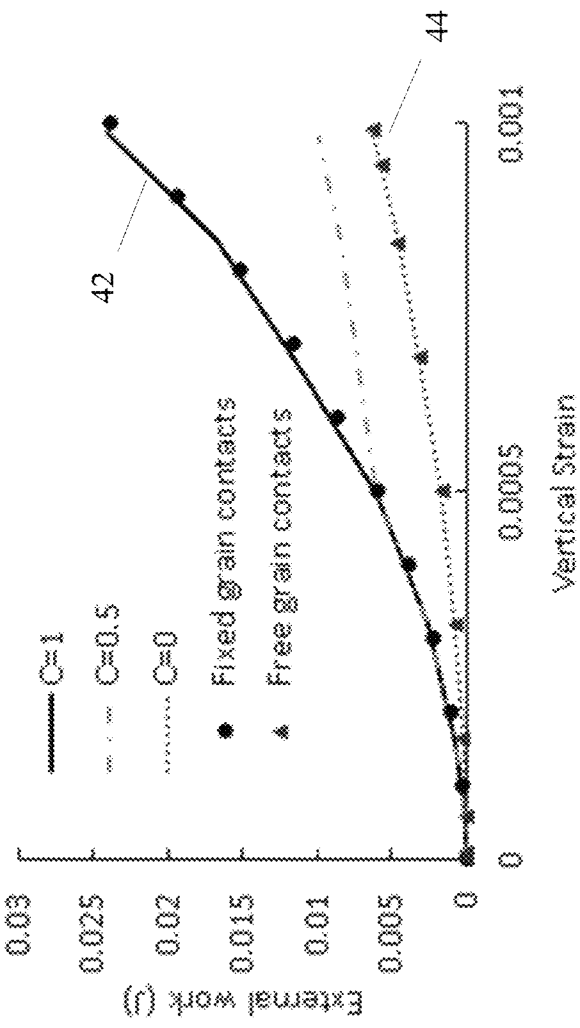
FIGS. 4A and 4B depict grain mesh of a three-grain packing and grain behavior of fixed (C=1), free (C=0) and intermediate cohesive contact level (C=0.5).
Figure 4A:
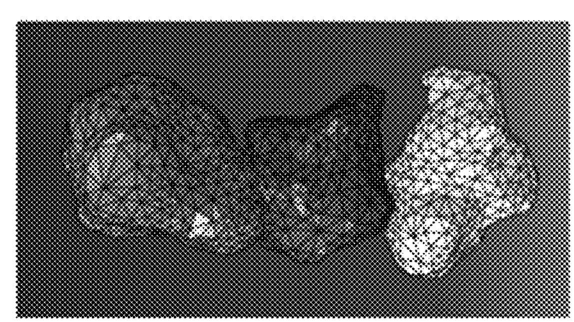

Referring now to FIGS. 4A and 4B, a grain mesh of a three-grain packing (FIG. 4A) is shown, where grains are differentiated by shades of grey. FIG. 4B shows that the parametric cohesive contact engine 32 can reproduce the fixed grain contact 42 and free grain contact 44 behaviors by changing the consolidation level C.

In order to validate this proposed simplification, first we test the parametric cohesive contact engine through a simple scenario of three-grain packing. The grains are extracted from a micro-CT image of Fontainebleau sandstone model (see F. D. E. Latief, B. Biswal, U. Fauzi, and R. Hilfer, Continuum Reconstruction of the Pore Scale Microstructure for Fontainebleau Sandstone, Phys. A Stat. Mech. Its Appl. 389, 1607 (2010)). The bottom of the packing is fixed and a tensile stress is applied that acts on the top of the packing.

FIGS. 4A and 4B show that the parametric cohesive contact engine 32 can reproduce the fixed and free grain contact behaviors when C=1 and C=0, respectively. FIG. 4A shows the grain mesh used in the FE simulation. FIG. 4B shows three simulation results of the cohesive contact model with different consolidation levels C, and two simulation results of fixed and free grain contacts (no cohesive contacts applied). When C=0, the grains will be readily separated by tensile stresses. The external work increases as a result of the particle displacement by the applied force. When C=1, the three grains behave as a solid framework with no grain separation, and the external work accounts for the tensile force and overall displacement. When C=0.5, the result exhibits a transition from fixed grain contacts to free grain contacts because of the damage and failure of bonds. The transition is not very smooth due to the fact that only two bonded surfaces exist in the packing.

Figure 5:
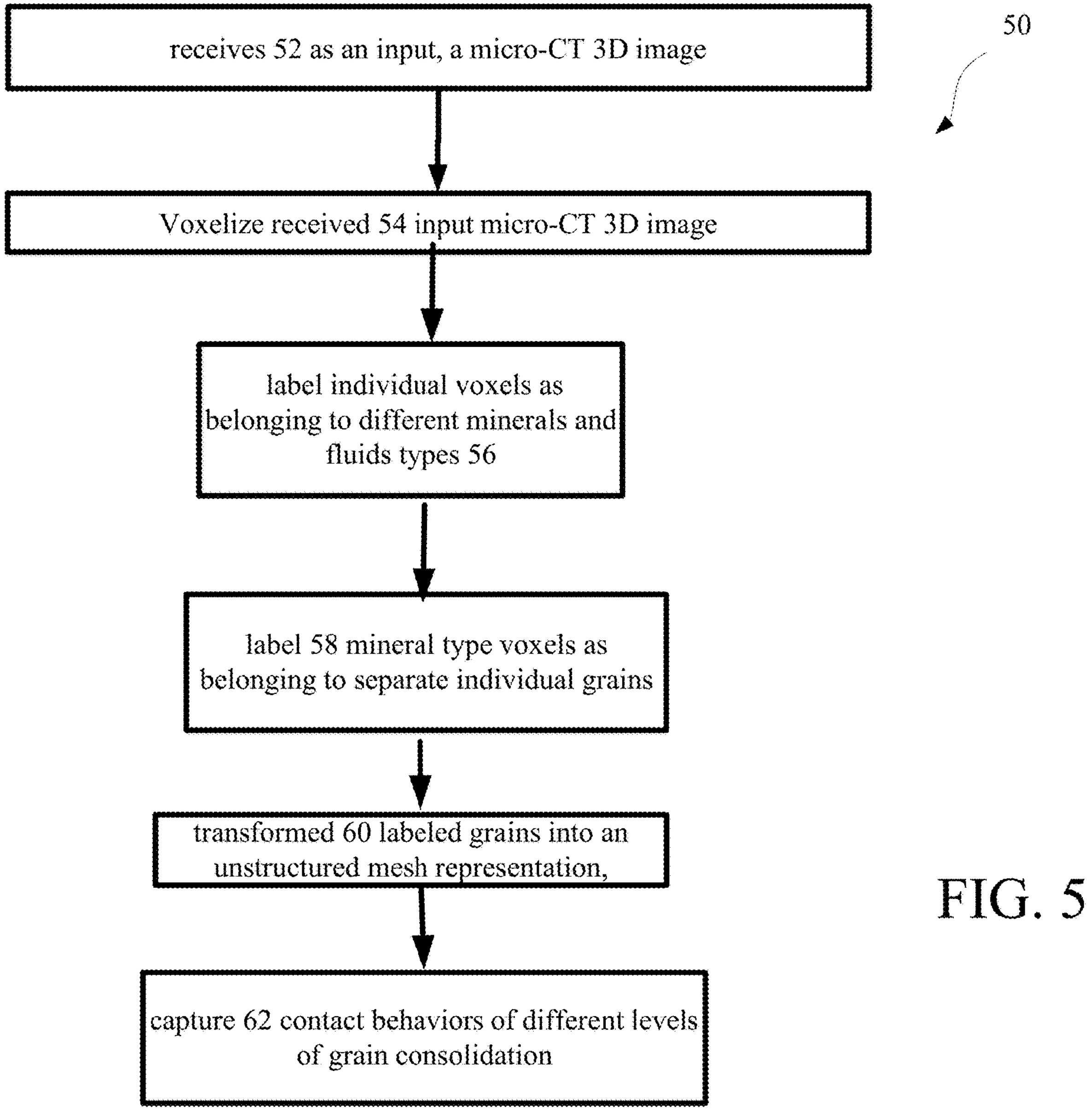
FIG. 5 is a flow diagram depicting parametric cohesive contact engine process.

Referring now to FIG. 5, a process 50 for correctly modeling variable grain-grain consolidation to correctly simulate mechanical rock properties, is shown. Process 50, followed by process 33, recovers the correct NCS pore geometry to simulate petro-physical (petroleum containing rock samples) properties under the correct conditions. Process 50 also allows grain relocation capabilities, including failure test simulations.

The process 50 receives 52 as an input, a micro-CT 3D image that is voxelized 54 meaning it is fitted with a computer-generated mesh to provide a 3D voxelized image. The voxelized image captures a representative elemental volume of the rock, with enough resolution to identify individual grains and pore geometry within the rock.

The process 50 labels 56 a first segmentation of the micro-CT image to label individual voxels as belonging to different minerals and fluids types. The process 50 labels a second segmentation 58 of mineral type voxels as belonging to separate individual grains. Such a process can be done by a so-called watershed method and derived methods (see discussion above).

The labeled, voxelized 3D image is transformed 60 into an unstructured mesh representation, e.g., a grains meshed model, where elements of the same grain are optimized for FE simulation, and the elements at each side of a contact between grains conform to each other, without voids or overlaps in the contact boundary (see discussion above). The grains meshed model is input into the Abaqus simulation engine 33, and strains/stress boundary conditions are setup using the micro-mechanics plugin (see Qin et al., 2018 above).

A general parametrization of the parametric cohesive contact engine 32 is used to capture 62 contact behaviors of different levels of grain consolidation including two extreme scenarios: free grains (see FIG. 3C), where only friction is modeled between grains, and fixed grains (see FIG. 3A), where grains are completely fused. The free grain contacts introduce duplicate nodes and elements that allows grain relocation, whereas the fixed grain contact models the solid framework as a whole. The strains/stress boundary conditions from the micro-mechanic plugin provide the parametrization of the parametric cohesive contact engine 32. The general parametrization of the parametric cohesive contact engine 32 is used to capture contact behaviors of different levels of grain consolidation between these extremes (see FIG. 3B).

Discussed below are test results conducted on sandstone samples that are compared with laboratory-measured elastic moduli to calibrate its degree of consolidation. Conventional simulations that do not include grain contact modeling, tend to overestimate the elastic moduli. The parametric cohesive contact engine 32 discussed herein correctly captures the grain contact behavior via the parameter C.

Test Case Results

Figures 6A, 6B, 6C, 7A, 7B, 7C:
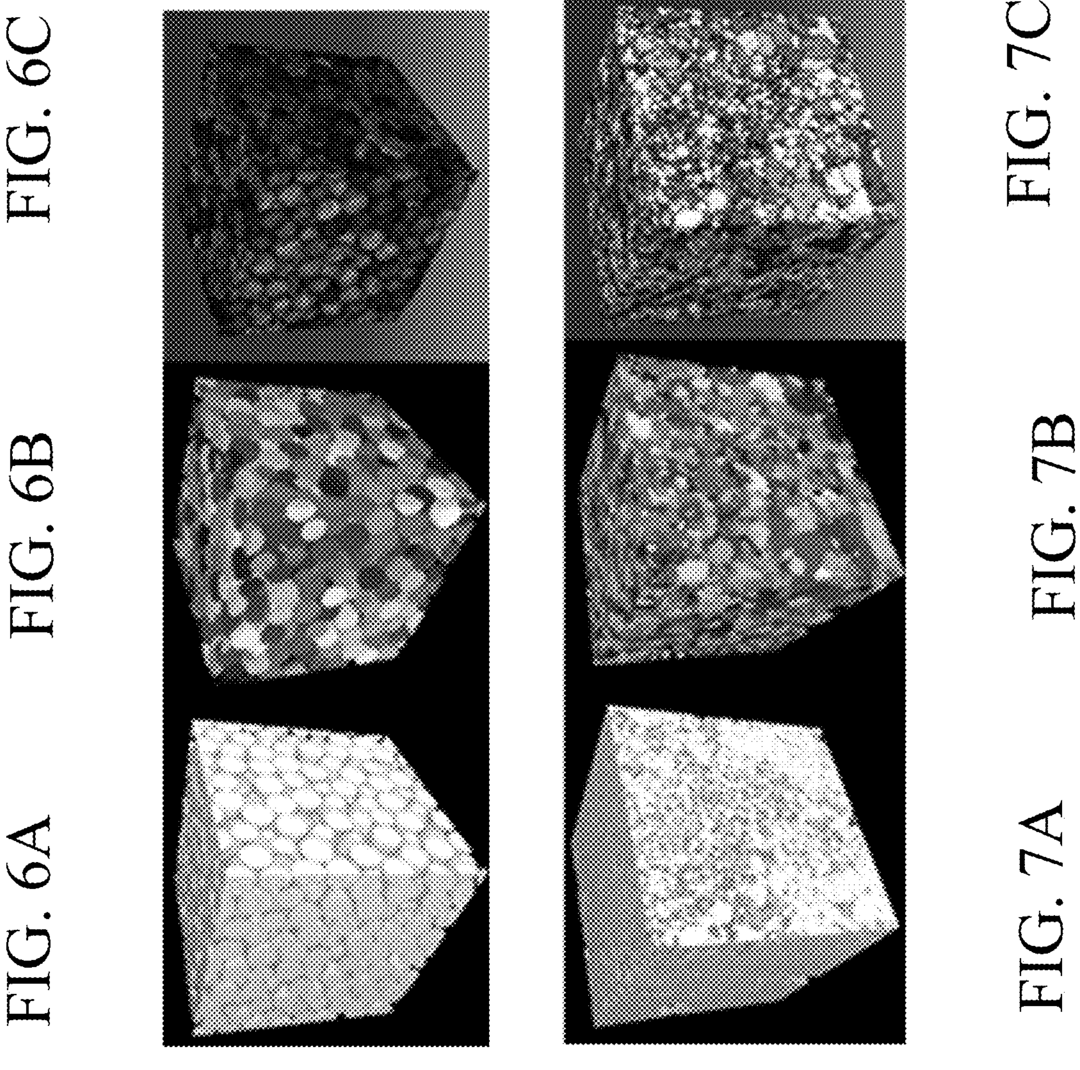
FIGS. 6A-6C depict images for a binary micro-CT image of sphere packing, segmented grains indicated by shades of gray, and grain mesh for the FE solver.
FIGS. 7A-7C depict images for a binary micro-CT image of Grosmont Carbonate, segmented grains indicated by shades of grey, and grain mesh for the FE solver (only exterior edges are shown for better visualization).

Referring now to FIGS. 6A-6C, simulation test results are shown for rock samples including sphere packing. A monodisperse sphere packing is a very good example of free grain-grain contact behavior. Numerical simulations directly based on image voxels, and only allowing fixed grain-grain contacts, tend to overestimate the elastic modulus and stiffness. The micromechanical finite element model allows grain relocation and results in a very close modulus as "laboratory" data (a solution from granular dynamic simulations).

FIG. 6A is the original binary micro-CT image of sphere packing, FIG. 6B is the segmented grains indicated by shades of grey, and FIG. 6C is grain mesh for the FE solver. Using this sphere pack model we demonstrate that the parametric cohesive contact engine can mimic the free grain contacts. Following Z. Sun, R. Salazar-Tio, L. Duranti, B. Crouse, A. Fager, and G. Balasubramanian, Prediction of Rock Elastic Moduli Based on a Micromechanical Finite Element Model, Comput. Geotech. 135, 104149 (2021), a material property of quartz for the sphere packing: density is 2.65 g/cm3, bulk modulus is 37.0 GPa, and shear modulus is 44.0 GPa. Table 1 summarizes the specifications for the sphere pack model.

TABLE 1

Specifications of the sphere packing.

| Rock type | Sphere packing |
|---|---|
| Sample size (voxels) | 398 × 319 × 398 |
| Voxel size (μm) | 14 |
| Porosity | 34.3% |
| Number of nodes | 693,635 |
| Number of elements | 3,306,874 |

The parametric cohesive contact engine has two parameters: the consolidation level C and the stiffness K. The consolidation level C is equal to 0 for free grain contacts. The stiffness K is predetermined to reproduce the mechanical behavior of fixed grain contacts.

A hydrostatic compression test can be performed to measure the bulk modulus and shear test to measure the shear modulus. Table 2 summarizes the results.

TABLE 2

Bulk and shear moduli of sphere packing.

| | Bulk modulus (GPa) | Shear modulus (GPa) |
|---|---|---|
| Cohesive contact model with C = 0 | 1.29 | 1.57 |
| Free grain contacts | 1.34 | 1.62 |
| Difference | 3.7% | 3.1% |

The parametric cohesive contact engine with C=0 yields very similar moduli as the free grain contacts. See Z. Sun, R. Salazar-Tio, L. Duranti, B. Crouse, A. Fager, and G. Balasubramanian, Prediction of Rock Elastic Moduli Based on a Micromechanical Finite Element Model, Comput. Geotech. 135, 104149 (2021). The results are not expected to be identical considering that the numerical simulations are based on different contact mechanisms.

Grosmont Carbonate is a good example of fixed grain-grain contact behavior, given that Carbonates are typically recrystallized due to diagenetic processes. Therefore, all the grains behave as a solid framework. In this section, we perform the grain segmentation to demonstrate that cohesive contacts can mimic the behavior of fixed grain contacts when C=1.

FIG. 7A is the original binary micro-CT image of Grosmont Carbonate, FIG. 7B is segmented grains indicated by different shades of gray, and FIG. 7C is grain mesh for the FE solver (only exterior edges are shown for better visualization).

Table 3 summarizes the specifications for the Grosmont Carbonate model. A material property of 50% calcite and 50% dolomite for the Grosmont Carbonate: density is 2.79 g/cm3, bulk modulus is 81.6 GPa, and shear modulus is 36.7 GPa. The consolidation level C is equal to 1 for fixed grain contacts and the stiffness K is the calibrated parameter.

TABLE 3

Specifications of the Grosmont Carbonate.

| Rock type | Grosmont Carbonate |
|---|---|
| Sample size (voxels) | 400 × 400 × 400 |
| Voxel size (μm) | 2.02 |
| Porosity | 24.7% |
| Number of nodes | 11,416,848 |
| Number of elements | 50,105,905 |

Table 4 shows the comparative results with our previous simulation for this model, and show that the parametric cohesive contact engine with C=1 gives very similar elastic moduli as the fixed grain contacts.

TABLE 4

Bulk and shear moduli of Grosmont Carbonate.

| | Bulk modulus (GPa) | Shear modulus (GPa) |
|---|---|---|
| Cohesive contact model with C = 1 | 23.8 | 13.6 |
| Fixed grain contacts | 24.0 | 13.4 |
| Difference | 0.8% | 1.5% |

Many sedimentary rock samples may exhibit different levels of consolidation as sediments are compacted and cemented under various geo-mechanical and geochemical conditions. In this section we focus on an intermediate consolidated rock, a Fontainebleau Sandstone.

Figures 8A, 8B, 8C:
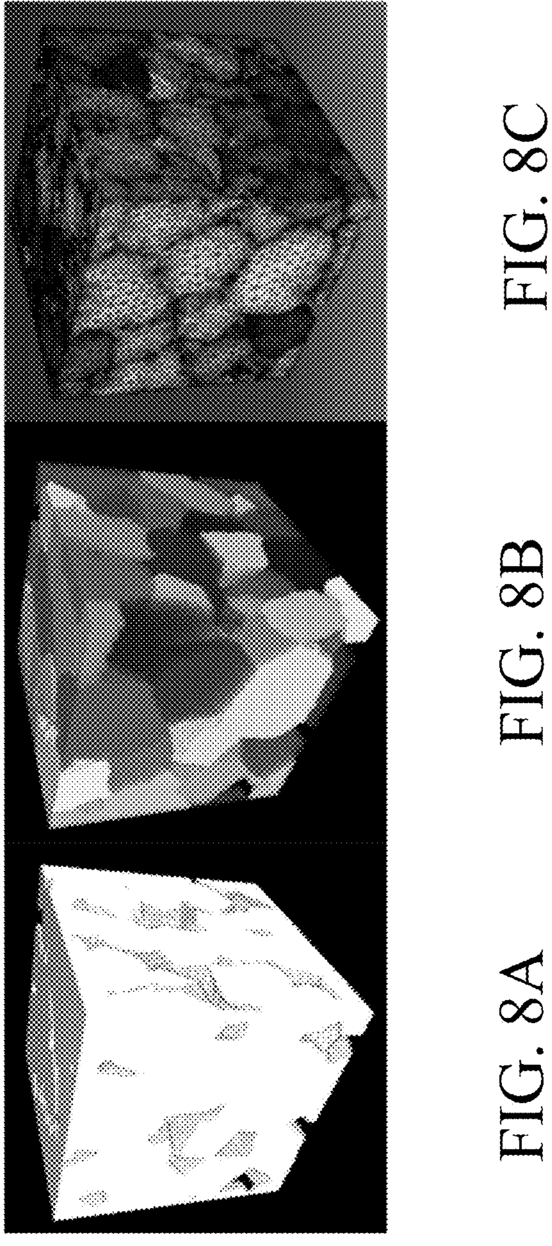
FIGS. 8A-8C depict images for a binary micro-CT image of Fontainebleau model, segmented grains indicated by shades of grey, and grain mesh for the FE solver

For illustration purposes, the parametric cohesive contact engine 32 is applied to a Fontainebleau model, with a relatively small volume of 100×100×100 voxels, and voxel size of 7.3 μm. FIGS. 8A-8C show the binary voxelized image FIG. 8A, segmented grains FIG. 8B, and conformal grain mesh FIG. 8C used in the FE solver. The material properties assigned are for quartz as in the sphere packing case.

Figures 9A, 9B:
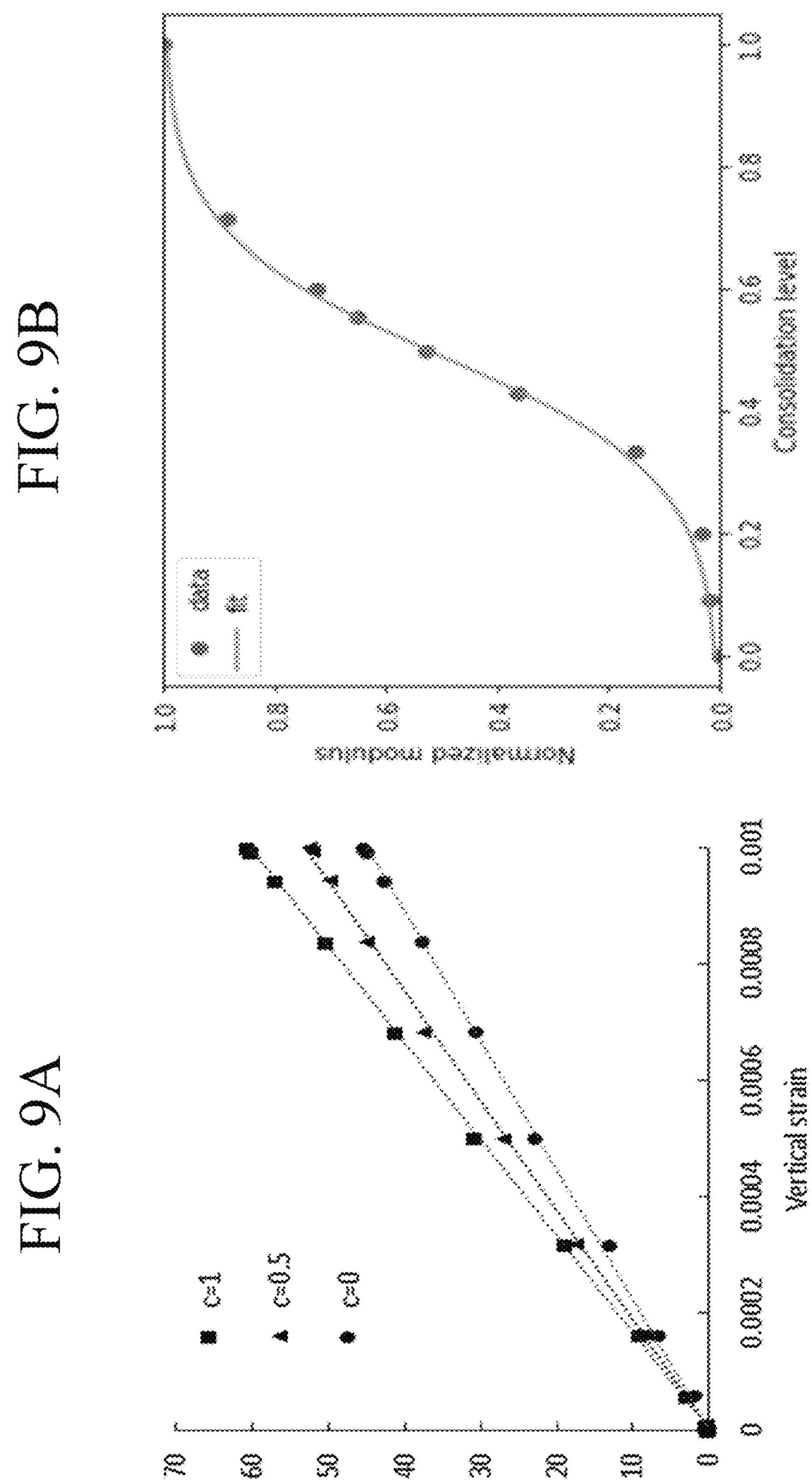
FIGS. 9A, 9B depict graphs for stress-strain response for various consolidation levels and normalized modulus as a function of consolidation level.

Uniaxial strain tests are performed on this Fontainebleau model, which requires an incremental strain in the vertical direction and zero strains in the horizontal directions. FIG. 9A shows stress-strain behaviors of various consolidation level C. When C=0 and C=1, the cohesive contact model 32 can reproduce the moduli of free and fixed grain contacts, respectively. The modulus shows an increase as the consolidation level C increases.

FIG. 9B shows the normalized modulus, [M(C)−M(0)]/[M(1)−M(0)] as a function of the consolidation level. The modulus tends to become asymptotic approaching to the two ends. The data can be fitted well by a logistic function:

$$\frac{M(C)-M(0)}{M(1)-M(0)} = f(C) = \frac{1}{1+e^{-k(C-x_0)}} \quad \text{Eq. (8)}$$

where the fitted parameters k and $x_0$ are 10.0 and 0.5, respectively. The purpose of using a fitting function is to minimize the number of simulations needed to produce a complete contact model valid for all range of consolidation levels 0≤C≤1 behavior. Two intermediate simulations and the two end-member simulations (C=0 and C=1) can completely capture the effect of consolidation level.

Figures 10A, 10B, 10C:
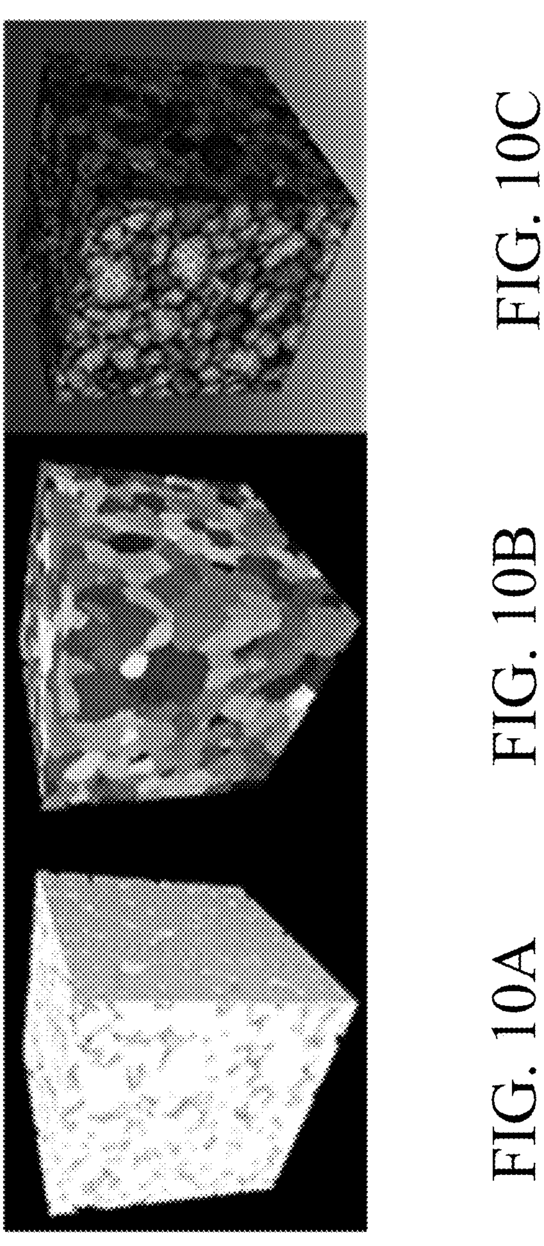
FIGS. 10A-10C depict images for a binary micro-CT image of Fontainebleau sandstone, segmented grains, and grain mesh.

With the knowledge obtained from simulations on the small Fontainebleau model, the parametric cohesive contact engine 32 is applied to a larger Fontainebleau Sandstone micro-CT model of 288×288×300 voxels. The voxel size is 7.5 μm. The sample porosity is 14.7%. The material properties are assigned as quartz. FIG. 10A shows the voxelized image, FIG. 10B segmented grains, and FIG. 10C conformal grain mesh.

Figure 11B:
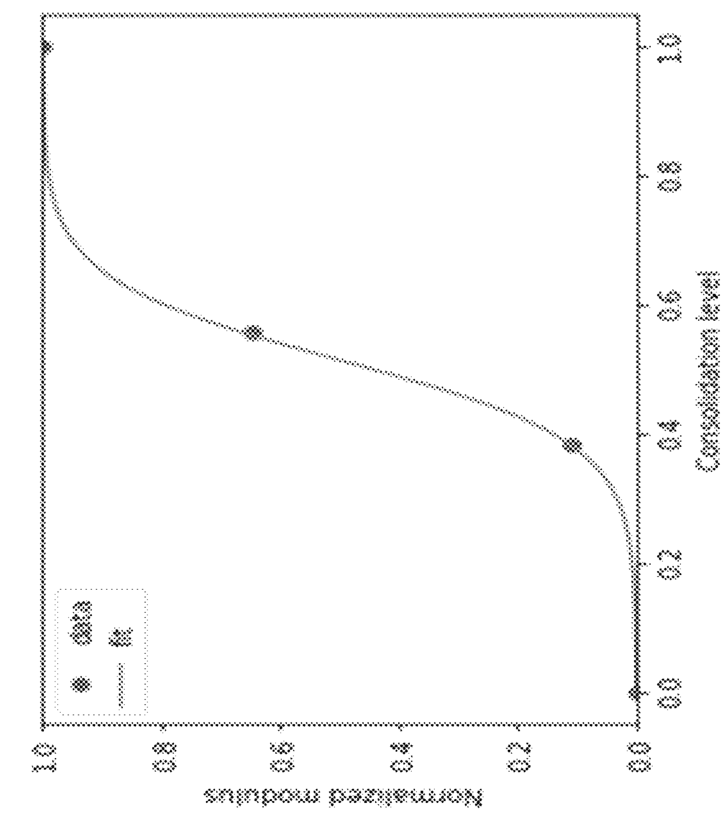
FIGS. 11A, 11B depict stress-strain response for various consolidation levels C and normalized modulus as a function of consolidation level.
Figure 11A:
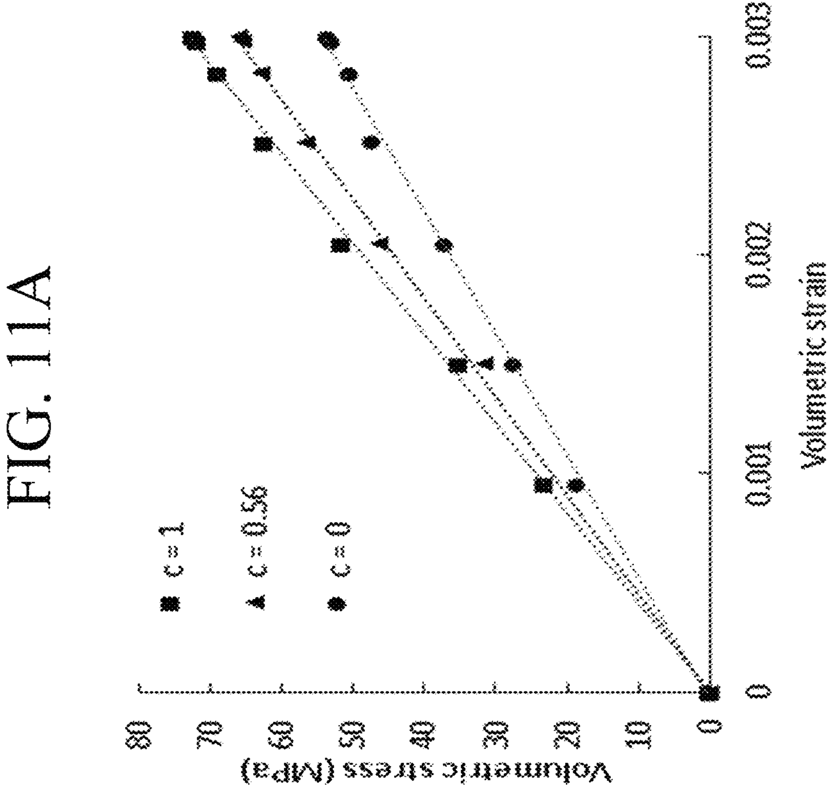

A hydrostatic compression test is performed to measure the bulk modulus. FIG. 11A shows stress-strain response for various consolidation levels C. FIG. 11B shows normalized modulus as a function of consolidation level. The result can be fitted by the logistic function (Eq. 8) shows the stress-strain behaviors for various consolidation levels C. The parametric cohesive contact engine can reproduce the moduli of fixed and free grain contacts when C=1 and C=0, respectively. Two intermediate consolidation levels result in a modulus in between. The parameters k and $x_0$ of the above logistic fitting function (Eq. 8) are 15.9 and 0.5, respectively.

The experimentally measured bulk modulus is ~22.2 GPa, which corresponds to a consolidation level C of 0.56 based on the simulation results in FIG. 11B. A shear test can be performed to measure the shear modulus when C=0.56, which obtains a shear modulus of 24.9 GPa, which is also close to the laboratory-measured shear modulus.

The parameterized cohesive contact model 32 allows the users to select the consolidation level as an input parameter based on their knowledge of diagenesis history of sedimentary rock samples.

The rock failure behavior manifests the significance to capture well the consolidation level. Uniaxial compression tests are widely used to determine the uniaxial compressive strength (UCS) and deformability of rock samples. The testing sample is loaded in the axial direction with no confinement in the radial directions. The ratio of height/diameter of the samples is typically between 2 and 3. A ratio smaller than 2 will result in high uniaxial compressive strength.

Figures 12A, 12B:
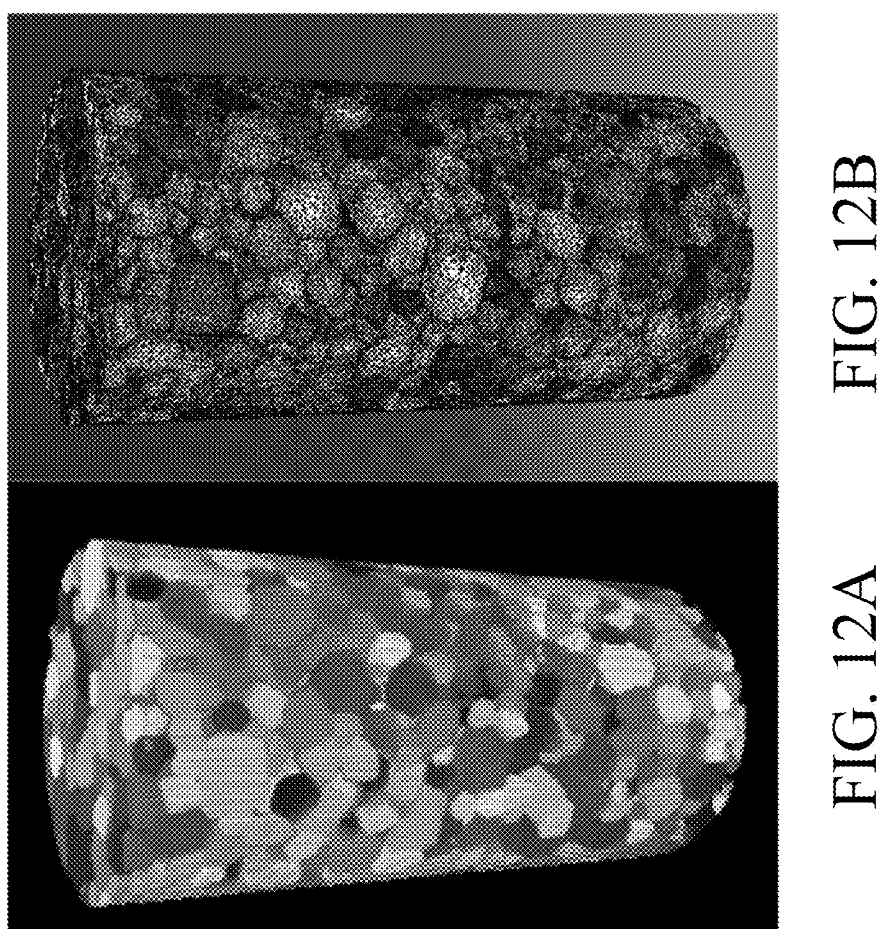
FIGS. 12A, 12B depict a voxelized image of segmented grains (FIG. 12A) and grain meshing for FE simulation of failure test (FIG. 12B).

In this section, uniaxial compression tests are performed on a cylindrical volume from the Fontainebleau model used above, at various consolidation levels C. All the other model parameters remain invariant. The sample has a height of 500 voxels and a diameter of 250 voxels. The voxel size is 7.3 μm. FIG. 12A shows the voxelized image of segmented grains and FIG. 12B shows the corresponding grain mesh used in the FE simulations of uniaxial compression test.

Figure 13:
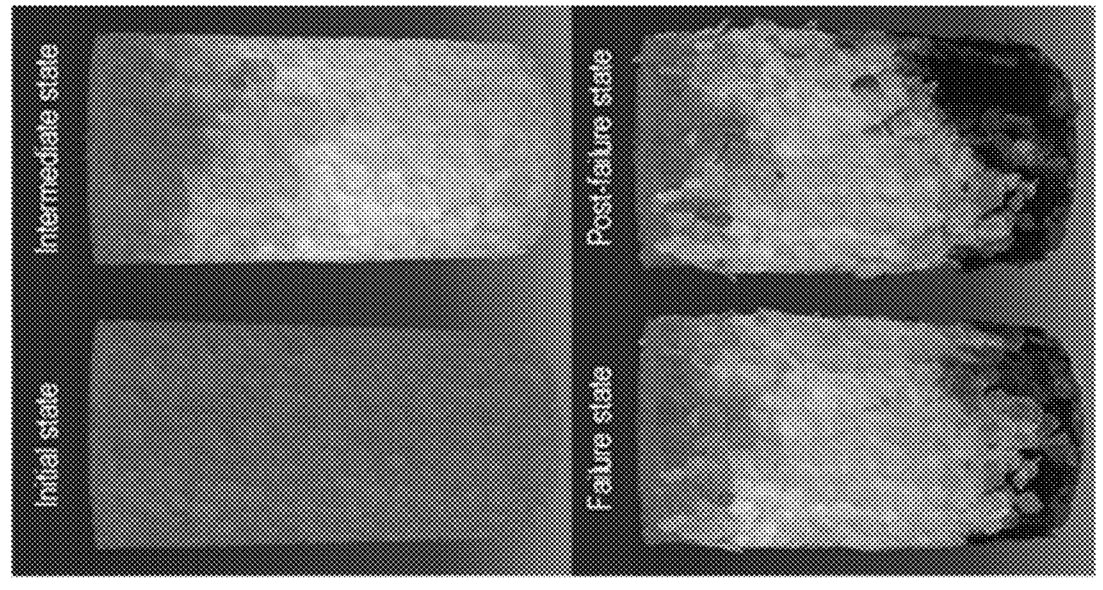
FIG. 13 depicts an evolution of vertical displacement field as the Fontainebleau model is compressed in the vertical direction.

FIG. 13 shows the evolution of vertical displacement field from an initial state to an intermediate state as the sample is being compressed in the vertical direction (C=0.2). The Fontainebleau sample is initially intact and finally ruptures with a shear band.

Figure 14:
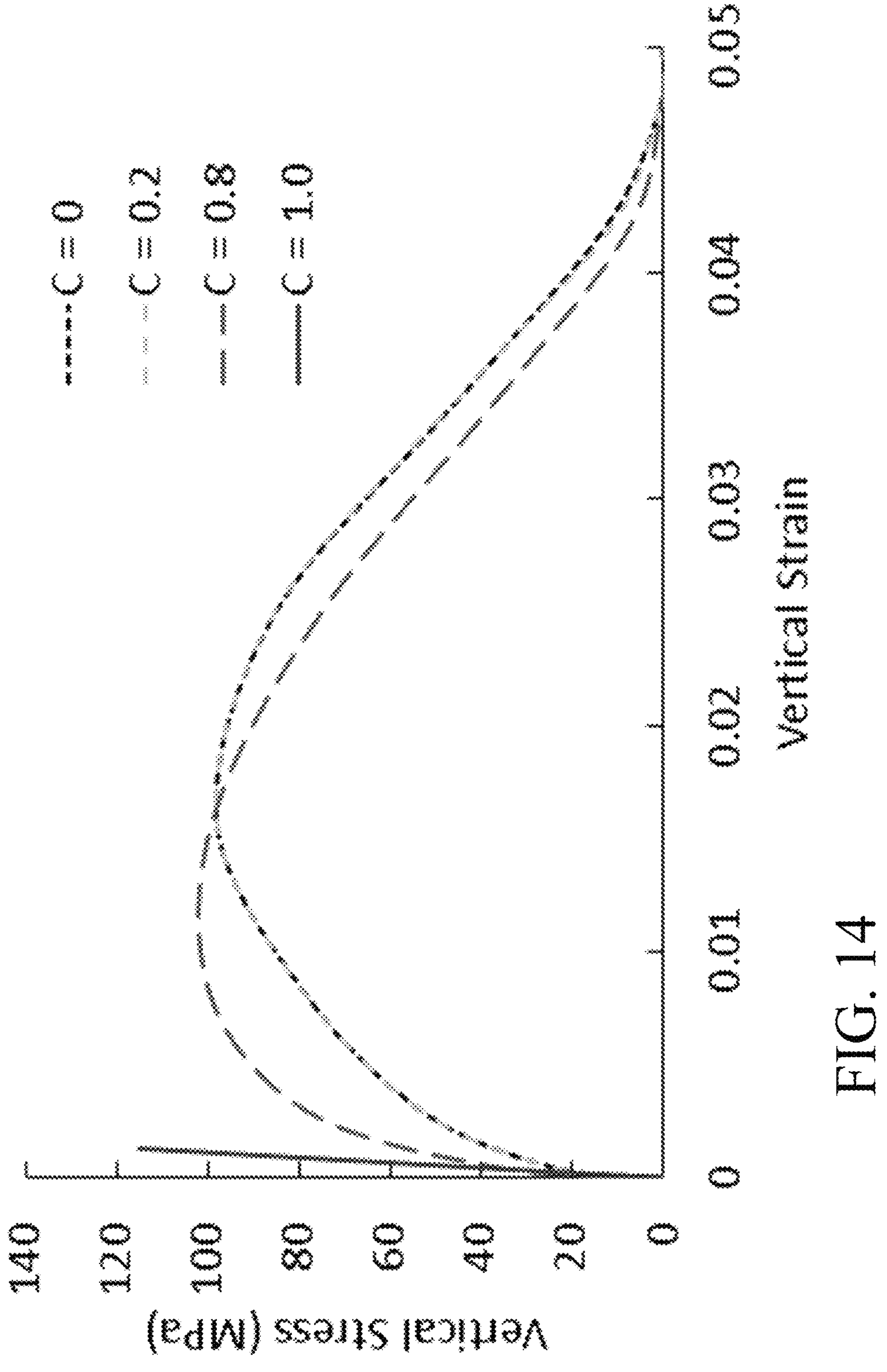
FIG. 14 depicts vertical stress as a function of vertical strain for various consolidation levels C.

FIG. 14 shows the vertical stress as a function of vertical strain for various consolidation levels C. When C=1, the grains are fused together and the sample behaves elastic with an infinite strength. When C=0, the grains are unconsolidated and the sample fails when the vertical stress reaches the uniaxial compressive strength, with friction as the only remaining force. An intermediate value of C results in stress-strain curves in between the two end-member scenarios.

When C is relatively small (e.g. C=0.2), the stress-strain curve is very close to the result of C=0 due to the asymptotic nature of Eq. (8), and shown in FIGS. 9B and 11B. The simulation results show that the rock failure behavior is conditioned by the consolidation level, which is parameterized into the cohesive contact model 32.

FIG. 14 illustrates vertical stress as a function of vertical strain for various consolidation levels C. A larger value of C results in a larger uniaxial strength and elastic modulus.

Table 6 summarizes the Young's modulus and uniaxial compressive strength based on the results shown in FIG. 14.

TABLE 6

Bulk and shear moduli of Fontainebleau Sandstone.

| | Young's modulus (GPa) | Uniaxial compressive strength (MPa) |
|---|---|---|
| C = 0 | 57.0 | 98.2 |
| C = 0.2 | 57.4 | 98.3 |
| C = 0.8 | 86.1 | 102.6 |
| C = 1.0 | 89.8 | infinity |

A larger consolidation level parameter C will result in a larger Young's modulus and uniaxial compressive strength. The numerical simulations for this particular Fontainebleau model yield reasonable values of Young's modulus and uniaxial compressive strength compared to referenced experimental data.

In addition to the consolidation level, the contact friction is another parameter for rock failure. Applying the so called "Coulomb friction model," which relates the maximum allowable frictional stress across a grain contact to the contact pressure between the grains, results in a frictional stress at which sliding of the contacts starts as proportional to the product of friction coefficient and contact pressure. A friction coefficient of 0.2 is assumed. In addition, non-smooth contact boundaries can also add friction to grain contacts.

Figures 15A, 15B, 15C:
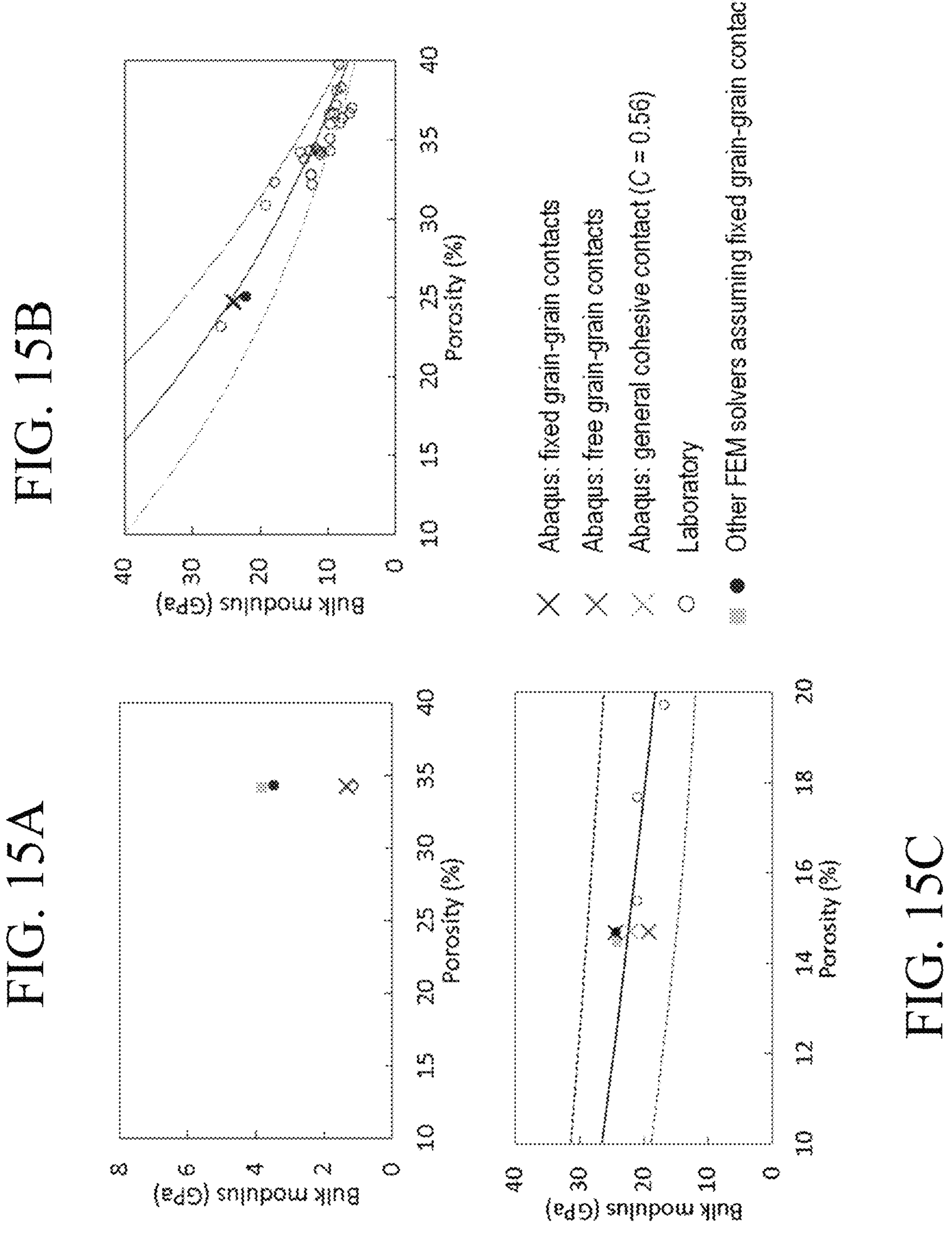
FIGS. 15A-15C depict bulk modulus as a function of porosity for various samples.

Referring now to FIGS. 15A-15C, these figures show measured and simulated bulk moduli for sphere pack (FIG. 15A), Grosmont Carbonate (FIG. 15B), and Fontainebleau Sandstone (FIG. 15C).

For the sphere pack (FIG. 15A), the grain contact model allows free grain-grain contacts resulting in very close bulk modulus to the laboratory data, compared to other numerical simulations that only allow fixed grain-grain contacts. Sphere packing is a very good example of free grain-grain contact behavior. Numerical simulations directly based on image voxels, and only allowing fixed grain-grain contacts, tend to overestimate the elastic properties.

The described micromechanical finite element model allows grain relocation and results in a very close modulus as the "laboratory" data (a solution from granular dynamic simulations) see Z. Sun, R. Salazar-Tio, L. Duranti, B. Crousc, A. Fager, and G. Balasubramanian, Prediction of Rock Elastic Moduli Based on a Micromechanical Finite Element Model, Comput. Geotech. 135, 104149 (2021).

For Grosmont Carbonate (FIG. 15B), all conventional numerical approaches and the grain contact model assume fixed grain-grain contacts and give a similar prediction of bulk modulus.

For Fontainebleau Sandstone (FIG. 15C), numerical simulations are performed for both free and fixed grain-grain contacts, which serve as two end-member case scenarios. The real grain-grain contact behavior of Fontainebleau Sandstone lies in between these two end-member scenarios, which is reproduced correctly by our parametric cohesive contact model using C=056. Many sedimentary rock samples may exhibit different levels of consolidation as sediments are compacted and cemented under various geomechanical and geochemical conditions.

In FIGS. 15B and 15C, the upper and lower dashed lines serve as references for the numerical results. The upper and lower dashed lines correspond to upper and modified lower Hashin-Shtrikman bounds (soft sand model). The solid line represents a stiff sand model. Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive, data from or transfer data to, or both, one or more mass storage devices for storing data (e.g., magnetic, magneto-optical disks, or optical disks), however, a computer need not have such devices.

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

What is claimed is:

1. A computer implemented method for conducting a simulation of physical properties of a porous medium, comprises:

receiving by a computer, an image that captures a representative elemental volume of the porous medium, labeling by the computer the image as individual voxels according to physical properties of the porous medium;

transforming by the computer the labeled voxels into an unstructured conformal mesh representation; and applying the unstructured conformal mesh representation to a parametric cohesive contact engine, with the parametric cohesive contact engine executing a parametric cohesive contact model that has an adjustable parameter, a critical separation $\delta^0$ that is conditioned according to a consolidation level, wherein the critical separation $\delta^0$ is a length.

2. The method of claim 1, wherein labeling the image as individual voxels according to physical properties of the porous medium comprises labeling the image as individual voxels according to a solid type or a fluid type.

3. The method of claim 2, wherein the solid type comprises minerals.

4. The method of claim 2, further comprising labeling by the computer the solid type voxels as belonging to particles.

5. The method of claim 4, wherein transforming the labeled voxels into an unstructured conformal mesh representation comprises transforming by the computer the labeled voxels into an unstructured conformal mesh representation for all particles.

6. The method of claim 5 wherein transforming the labeled voxels further comprises:

optimizing elements of the same particle for a finite element simulation, with the elements at each side of a contact between particles conforming to each other without voids or overlaps in the contact boundary.

7. The method of claim 4, wherein the particles comprise one or more porous rocks.

8. The method of claim 4 wherein the particles are free particle contact where only friction is modeled between particles, or fixed particle contact where particles are completely fused.

9. The method of claim 1, wherein the image comprises a 3D image.

10. The method of claim 9 wherein the 3D image has sufficient resolution to identify individual particles and a connected pore geometry.

11. The method of claim 1 wherein the parametric cohesive contact engine relates the critical separation $\delta^0$ to the consolidation level defined as C according to $$\delta^0 = \Delta x \frac{C}{1 - C}$$

where $\Delta x$ is a characteristic length with the same units of $\delta^0$.

12. A computer system comprises:

one or more processor devices;

memory coupled to the one or more processor devices;

storage storing executable computer instructions for conducting a simulation of physical properties of a porous medium, the instructions, when executed by the one or more processors, cause the one or more processors to perform operations comprising:

receiving an image that captures a representative elemental volume of the porous medium, labeling the image as individual voxels according to physical properties of the porous medium;

transforming the labeled voxels into an unstructured conformal mesh representation; and applying the unstructured conformal mesh representation to a parametric cohesive contact engine, with the parametric cohesive contact engine executing a parametric cohesive contact model that has an adjustable parameter, a critical separation $\delta^\circ$ that is conditioned according to a consolidation level, wherein the critical separation $\delta^0$ is a length.

13. The computer system of claim 12, wherein labeling the image as individual voxels according to physical properties of the porous medium comprises labeling the image as individual voxels according to a solid or a fluid type.

14. The computer system of claim 13, wherein the instructions further comprise labeling the solid type voxels as belonging to particles; and wherein transforming the labeled voxels into an unstructured conformal mesh representation comprises transforming by the computer the labeled voxels into an unstructured conformal mesh representation for all particles.

15. The computer system of claim 12, wherein the image comprises a 3D image having sufficient resolution to identify individual particles and a connected pore geometry.

16. The computer system of claim 12 wherein the parametric cohesive contact engine relates the critical separation $\delta^0$ to the consolidation level defined as C according to $$\delta^0 = \Delta x \frac{C}{1 - C}$$

where $\Delta x$ is a characteristic length with the same units of $\delta^0$.

17. The computer system of claim 12 wherein the porous medium is a porous rock, and the instructions further comprise:

applying the parametric cohesive contact engine to a finite element solver with prescribed strains/stress boundary conditions and particle-particle contacts according to the parametric cohesive contact model;

determining contact behaviors at different levels of particle consolidation to convert the parametric cohesive contact engine into a net confining stress model; and performing a flow simulation on the net confining stress model.

18. A computer program product tangibly stored on a computer readable non-transitory storage device that stores executable computer instructions to conduct a simulation of physical properties of a porous medium, the instructions for causing performance of operations comprising:

receiving by a computer, an image that captures a representative elemental volume of the porous medium, labeling by the computer the image as individual voxels according to physical properties of the porous medium;

transforming by the computer the labeled voxels into an unstructured conformal mesh representation; and applying the unstructured conformal mesh representation to a parametric cohesive contact engine, with the parametric cohesive contact engine executing a parametric cohesive contact model that has an adjustable parameter, a critical separation $\delta^0$ that is conditioned according to a consolidation level, wherein the critical separation $\delta^0$ is a length.

19. The computer program product of claim 18 wherein the parametric cohesive contact engine relates the critical separation $\delta^0$ to the consolidation level defined as C according to $$\delta^0 = \Delta x \frac{C}{1 - C}$$

where $\Delta x$ is a characteristic length with the same units of $\delta^0$.

20. The computer program product of claim 18, wherein labeling the image as individual voxels according to physical properties of the porous medium comprises labeling the image as individual voxels according to a solid type or a fluid type, wherein the instructions further comprise labeling the solid type voxels as belonging to particles; and wherein transforming the labeled voxels into an unstructured conformal mesh representation comprises transforming by the computer the labeled voxels into an unstructured conformal mesh representation for all particles.

* * * * *